(12) United States Patent
Schwager

(10) Patent No.: US 12,540,842 B2
(45) Date of Patent: Feb. 3, 2026

(54) LEVEL MEASURING DEVICE

(71) Applicant: WIKA Alexander Wiegand SE & Co. KG, Klingenberg (DE)

(72) Inventor: Sven Schwager, Hassmersheim (DE)

(73) Assignee: WIKA ALEXANDER WIEGAND SE & CO. KG, Klingenberg (DE)

( * ) Notice: Subject to any disclaimer, the term of this patent is extended or adjusted under 35 U.S.C. 154(b) by 797 days.

(21) Appl. No.: 17/706,671

(22) Filed: Mar. 29, 2022

(65) Prior Publication Data
US 2022/0316936 A1  Oct. 6, 2022

(30) Foreign Application Priority Data

Mar. 30, 2021 (DE) .......................... 102021108058.4

(51) Int. Cl.
*G01F 23/263* (2022.01)
*G01K 13/00* (2021.01)

(52) U.S. Cl.
CPC ........... *G01F 23/266* (2013.01); *G01K 13/00* (2013.01)

(58) Field of Classification Search
CPC ...... G01F 23/268; G01F 23/266; G01F 23/24; G01F 23/263; G01F 23/265; G01F 23/26; G01F 23/72; G01N 2035/1025; G01R 15/002; G01R 27/2605; G01R 1/30; G01R 27/00; G01D 5/12; H03M 1/1245
USPC .......................................... 73/304 C; 324/679
See application file for complete search history.

(56) References Cited

U.S. PATENT DOCUMENTS

2015/0097583 A1\* 4/2015 Gao ................... G01R 27/2605
324/679

FOREIGN PATENT DOCUMENTS

EP  3 053 273 B1  4/2015

\* cited by examiner

*Primary Examiner* — John E Breene
*Assistant Examiner* — Truong D Phan
(74) *Attorney, Agent, or Firm* — Gray Ice Higdon

(57) ABSTRACT

The invention relates to a level measuring device in which a plurality of capacitive sections can be connected to a reference capacitor, whereby a leveling voltage level can be evaluated and output as a level.

20 Claims, 7 Drawing Sheets

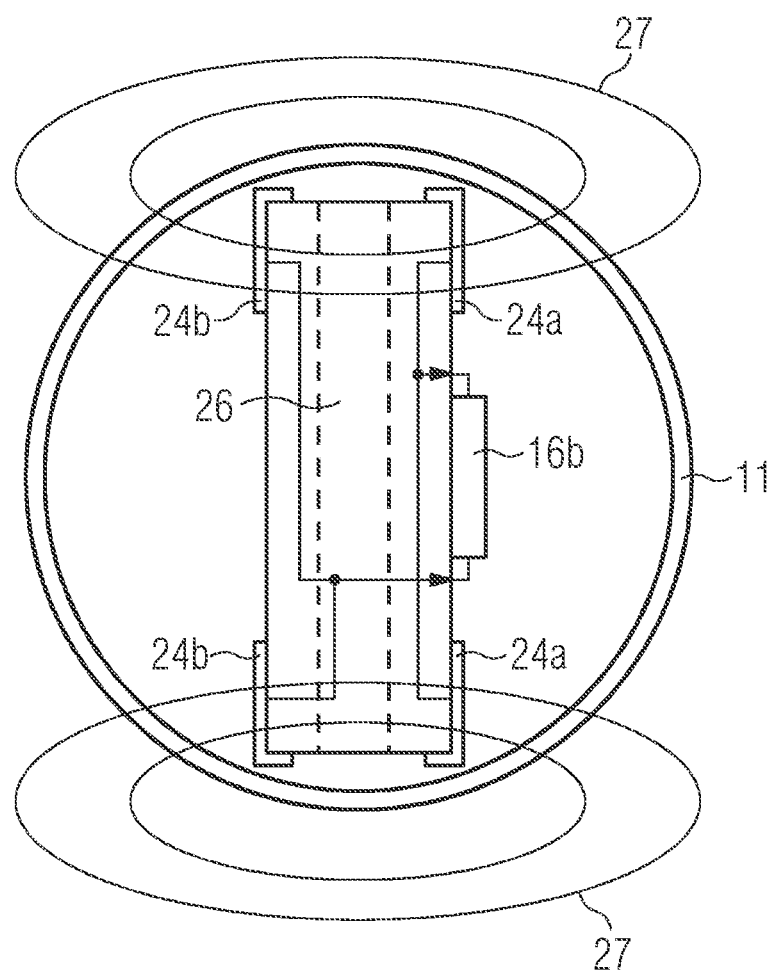

LEVEL MEASURING DEVICE

CROSS REFERENCE TO RELATED APPLICATIONS

The present patent application claims the benefit of the filing date of the German patent application DE 10 2021 108 058.4, filed on Mar. 30, 2021, the disclosure of which is incorporated in the present patent application by reference.

TECHNICAL FIELD

The disclosure relates to a level measuring device according to an independent claim, and to a method for measuring a level.

BACKGROUND

Measuring (filling) levels has always been an important task in industry. This requires reliable and precise technology, since an inaccurate or faulty measurement can lead to serious consequences.

Devices of a well-known type are, for example, magnetic float sensors or various capacitive level sensors. Conventional capacitive level sensors have the disadvantage that they are susceptible to interference from the environment. These include differences in the media themselves or temperature fluctuations in the medium and the environment. Furthermore, it can be considered problematic that prior art capacitive level sensors often need to be electrically connected to the vessel.

SUMMARY

The disclosure is based on the object of disclosing a novel level measuring device and a novel method for measuring a level.

According to the disclosure, the task is solved by a level measuring device which comprises the features indicated in an independent claim, and by a method which comprises the features indicated in another independent claim.

Possible configurations and further examples of the disclosure are the subject of the dependent claims.

A level measuring device comprises a sensor housing for accommodating at least one detection unit for detecting a (filling) level. Thereby, the sensor housing is elongated and/or tubular and extends along an axis of symmetry. The symmetry axis is aligned, for example, perpendicular to a filling level in a possible application of the level measuring device. The sensor housing is configured to be immersed in a medium, in particular a fluid or a solid, and to protect the internal detection unit from the medium itself. The sensing unit comprises at least two detection sections arranged one above the other. These are designed to detect a capacitance applied to the outside of the sensor housing, which forms analogously to the filling level. In general, it applies in particular that the capacitance increases proportionally to/with the fill level. Furthermore, an electronic circuit is provided which comprises a reference capacitor. This can be connected cyclically alternately electrically with the detection sections.

According to the disclosure, each detection section can be charged with opposite polarity to the reference capacitor. Thus, the reference capacitor, as a fixed component of the electronic circuit, can initially be positively charged, while at least part of the detection section is negatively charged. A detection section may include one or more pairs of electrodes or capacitors. Further, the detection section may be generally defined as at least one electrode with a corresponding counter electrode, but preferably as a pair of electrodes with a corresponding pair of counter electrodes. By doubling the number of electrodes, improved accuracy of the measurement is achieved.

When the reference capacitor is electrically coupled with each individual detection section, a voltage level is set, respectively which corresponds to the level present on/applied to the outside of the sensor housing or on the corresponding section of the sensor housing. In this circuitry, the reference capacitor and the detection section are ultimately connected in series and a voltage value is measured and noted or stored.

In particular, this procedure is carried out in sequence with the other detection sections, for example by means of a so-called multiplexer. At each coupling, the resulting voltage value is determined and noted or stored in a memory. Following this, the voltage value is converted into an externally applied level value. This can, for example, also be calculated as a percentage of the length of the detection unit and output as a percentage value. Further, such a signal can be provided in any common industry format, such as in a range of 4 mA to 20 mA and/or 0 to 5 V at the output.

The present level measuring device provides a low-cost solution for precise level measurement while providing a simple and universally applicable structure.

In one example of the level measuring device, at least one further specific detection section is arranged at a lower end of the detection unit or at least one further electrode is arranged for sensing a specific environmental variable. For example, it may therefore be possible that, if at least two detection sections are present, one of these forms the specific detection section. The lowest detection section is referred to here in each case as the detection section that first comes into contact with the filling medium at minimum level.

The specific detection section can be provided to determine a first (minimum) filling level. Another conceivable function is that by using the specific detection section, environmental influences, such as a temperature or a type of medium, and their basic values to be taken into account in terms of capacitive and other basic properties can be determined. If environmental influences are not sufficiently taken into account during level measurement, this can sometimes have serious consequences. These disturbing environmental influences are almost completely compensated or at least minimized by the coupling of the specific detection section with the electronic circuit. For this purpose, for example, capacitance fluctuations and/or deviations in the detected measured values, which have arisen due to temperature influences, can be determined and evaluated.

In a further example of the level meter, the coupling of the detection section and/or the specific sensing section with the electronic circuitry takes place in opposite polarity. In particular, this can always be done for each interrogation of a pair of electrodes or capacitor. For this purpose, an already mentioned multiplexer can also be used, which is designed to cyclically charge the detection sections or the reference capacitor in a programmed or provided sequence and then to perform the compensation measurement. Thus, on the one hand, the detection section can be charged, and on the other hand, the reference capacitor can be charged. This causes a voltage level between the reference capacitor and the detection section to settle, wherein the settled voltage level corresponds to a level on the outside of the protection pipe. A voltage level is thus formed which is then converted into a level value by the evaluation unit. The multiplexer can control not only the detection sections as a whole, but also each individual input of the detection sections. In concrete terms, controlling the anode and cathode forming a capacitor of each detection section may be done. However, inverse measurement is also possible, which increases the accuracy of the measurement in a simple and at the same time advantageous manner.

In a further example of the level measuring device, a plurality of detection units can be connected and/or coupled to one another within the sensor housing. In order to ensure communication between several detection units, each individual detection unit comprises at least one section evaluation unit. The section evaluation unit is in particular a component of the electronic circuit. An uppermost section can also form an interface to the outside and/or above in this case, respectively, which outputs the measured values.

In particular, when determining the voltage levels, the detection sections are electrically coupled to the reference capacitor and the values are processed at/in the section evaluation unit. Furthermore, if more than one detection unit is used, the values of the section evaluation units can be passed on to a higher-level section evaluation unit. The higher-level section evaluation unit forms a master, and the lower-level section evaluation units form a slave, respectively. In the master, all incoming data from the sections are calculated and a value corresponding to the total filling level is output to the outside.

In a further example of the level measuring device, the detection sections are each formed in pairs and/or opposite to/facing each other. For example, one of a plurality of possible detection sections each comprises a pair of electrodes and an associated pair of counter-electrodes. For example, the one electrode pair represents an anode of a capacitor and the counter electrode pair represents a cathode of the capacitor. The electrode pair itself in turn comprises two electrodes, which are then formed opposite each other on the detection unit and in particular in the detection section. For example, the electrode pairs, in particular the electrodes, are arranged as close as possible to the sensor housing. This offers the advantage of the most accurate measurement possible. For example, a distance between the two electrodes of an electrode pair is greater than a distance from an electrode pair to the counter electrode pair. In particular, it may be advantageous to provide the smallest possible distance between the pair of electrodes and the pair of counter electrodes.

In another example of the level measuring device, the detection sections are formed as conductive sections on or at circuit boards. This may, for example, be in the form of a conductive track mounted on a printed circuit board. For example, these conductive traces are arranged on edges of printed circuit boards or circuit boards. The traces may also be formed across an edge of the printed circuit board into a second dimension. Also, the printed circuit board may consist of multiple layers.

For example, the electrodes are brought as close as possible to the sensor housing wall, or optionally coupled to the sensor wall with connecting means. These can be, for example, electrical contacts or mechanically flexible, for example rubber-like connecting means.

In a further example of the level measuring device, it is provided that the detection unit with the detection sections is arranged on a mechanically flexible, in particular bendable, printed circuit board. This offers the advantage of a flexible application adapted to complex housing geometries. For example, it is possible to bend the flexible printed circuit board into a round or circular shape and arrange it in the likewise round sensor housing. The tubular sensor housing itself can also be bent. The interior of the sensor housing can be filled with a formed component/shaped piece, foam or spring element or cast with suitable materials. This increases a mechanical load capacity of the level gauge. The flexible detection unit may further comprise connections or interfaces for further additional detection units to extend the entire unit.

In another example of the level measuring device, the detection sections and/or the electrodes are connected to the sensor housing at least in sections in a fixed electrically conductive manner. Distances and air pockets between the electrodes and the sensor housing can have a negative effect on the measurement accuracy. A conductive connection between the electrode and sensor housing can overcome this disadvantage. The connection between electrodes and housing can be implemented in a variety of ways. For example, a minimized air gap, a direct contact or even a conductive connecting means can also establish the contact. For example, this can also be a filling or a potting, also a pressed-on contact of the electrode to the wall with a supporting means, such as a spring-elastic component, can support this. Another effect with potting is improved mechanical stability of the tubular sensor housing. The potting can be formed from two components, for example. The use of transparent polyurethane (PU) is suitable for this purpose, for example. Transparent potting also allows status lamps, for example light-emitting diodes, which are mounted on the circuit board, to be shone through. This can also be realized, for example, upwards, through a transparent connector or a transparent sensor housing.

In another example of the level meter, the sensor housing is formed of polypropylene (PP), polyvinyl chloride (PVC), polytetrafluoroethylene (PTFE), polyvinylidene fluoride (PVDF) or polyetheretherketone (PEEK). Polyvinylidene fluoride (PVDF) is a widely used plastic in industry and offers a number of advantages over other plastics, such as relatively high heat resistance up to about 140 degrees Celsius. By adding fillers, such as chalk or glass fibers, the mechanical properties can be significantly improved.

In another example of the level gauge, a diameter of the sensor housing is between 6 mm and 30 mm, in particular 10 mm to 20 mm.

In a further example of the level measuring device, the at least one detection unit is designed to be separable and/or shortenable in its length, at least in sections. Thus, several detection sections are evenly distributed over the entire length of the detection unit. An internal circuitry and design of the printed circuit board of the detection unit is, for example, designed in such a way that the printed circuit board can be shortened in sections. This makes it possible to achieve very individual lengths of the detection units and thus of the entire level measuring device. This can also be realized by connecting several detection units, whereby one or more detection unit(s) can then be adapted in length. In particular, the detection units can be separated between two detection sections in each case. Thus, lengths of the detection units can be adapted to different applications, in particular also with different dimensions, so that detection units can be assembled from a kind of modular system with a different number of detection units and different lengths to generate the level measuring device. In particular, at least one printed circuit board with which a detection unit is realized can be separated in sections, i.e. cut to length, together with the electronics. A truncation of the detection units is carried out in a lower area, for example, in such a way that at least the specific detection section and a detection section are present and/or attachable.

In a further example of the level measuring device, the electrodes or electrode pairs of the specific detection section are cross-shaped and/or designed with at least two electrode pairs. In particular, a double number of electrode pairs is to be provided. Since a first exact measurement of the level is only possible after reaching the second detection section, in particular the electrode pairs (first electrode pairs above the specific detection section), a dead zone during the measurement is to be kept as small as possible. This is achieved, for example, by doubling the number of electrode pairs, since the electrode pairs can be made shorter at the same time while maintaining the same measurement quality.

In a further example of the level measuring device, the specific detection section is designed shorter in relation to at least one further detection section, in particular the detection section following it. This has the effect of reducing the dead zone of the measurement and is also particularly advantageous in combination with the cross-shaped design of the specific detection section.

In a further example of the level measuring device, it is provided that the level measuring device or the electronic circuit is designed in such a way that self-learning, for example machine learning, is possible. Specific magnitudes can then be recognized, such as a type of medium and an associated temperature behavior. Learning can also take place over a longer period of time, in which case the accuracy improves step by step. By coupling the electrode pairs with the at least one reference capacitor and also the specific detection section, different capacitances can be determined and calculated. Further, the measurement becomes more accurate as the number of measured values increases. Furthermore, it is possible that additional data on the nature of the medium can be stored. The stored values can also be retrieved or edited manually at any time and then included in the formation of a total output measured value corresponding to the filling level.

In another example of the level measuring device, it is provided that the level meter can also be manually calibrated and/or taught at any time. For example, it is possible to set a fixed and known level and then calibrate the level measuring device. Optionally, another level measuring system, such as a float/floater, can be installed redundantly in the same housing, for example in the same container, which then exchanges or compares measured values for the level with the capacitive level measuring device. In this way, both systems or measuring devices can check each other and errors can be reduced. In particular, a so-called SIL or safety level can also be achieved if the two systems mentioned above are combined to form a uniform measuring system. The float measuring system can also be arranged or integrated directly on the sensor housing, so that the two measuring systems (capacitive and float) are implemented in a single device and realized, for example, with one circuit board.

In another possible example of the level measuring device, the detection unit and/or the section evaluation unit comprise or include at least one temperature sensor. This can be provided to measure a temperature in the medium or outside the medium, i.e. in its environment. This can further compensate for interfering environmental influences and increase the accuracy of the measurement. In this context, the use of several temperature sensors can also be particularly advantageous, for example at least one temperature sensor on each section evaluation unit.

In the process sequence of the measurement according to the disclosure, which is carried out in particular with a level measuring device according to claim 1 or a further development thereof, a detection process can be described in a possible example as follows. Each detection section of a detection unit is controlled and/or interrogated twice in each case. In this case, each detection section is electrically coupled to a reference capacitor. The reference capacitor is part of the respective section evaluation unit. During the detection process, the reference capacitor and the respective detection section are now charged with opposite polarity.

For example, in a first step, a detection section is initially charged with +5 V while at the same time the reference capacitor in the electronic circuit is uncharged. During a subsequent discharge, a first voltage level is established which corresponds to a level applied to the outside of the sensor housing. In a second step, the sensing section is discharged and the reference capacitor is charged. Accordingly, a discharge process takes place again, whereby a second voltage level is established. This is offset against the first voltage level from the first process, in particular the difference between the two is formed.

In the case of several detection sections and thus several electrodes/pairs, the detection sections are controlled using a multiplexer, for example. For example, voltage values/levels of all detection sections are queried in sequence, starting with the first, lowest electrode pair or the specific detection section. The multiplexer can also be used to control the anode and cathode of each of the respective electrodes or electrode pairs individually. Thus, various interconnection combinations between the electrode pairs and the reference capacitor are possible. In particular, inverse circuitry/coupling is also possible.

By combining normal and inverse coupling, a number of measurement results can be doubled. By using an average value from the results, the measurement accuracy can be increased. An additional increase in accuracy can be achieved by so-called "oversampling" of the measured values.

A sensor setup can also comprise several detection sections. The measured voltage levels of the individual detection sections can then be calculated in the respective section evaluation unit. If at least two detection units are present, the method can be adapted as follows, for example: The lower acquisition unit with the specific detection section first or, always determines the specific measured values of the medium. The uppermost section evaluation unit can be identical in construction to the subsequent, lower section evaluation units. However, the uppermost section evaluation unit is, for example, always to be functionally regarded as a higher-level master unit in function. The lower, then so-called slave section evaluation unit of the lower acquisition unit calculates the individual measured voltage levels of its electrodes and then passes on its resulting value to the master section evaluation unit of the acquisition unit above it.

In case of at least three acquisition units, for example, the resulting measured values of the lower sections are correspondingly first determined in the respective section evaluation unit and then made available to the uppermost detection unit (master evaluation unit). The lower detection units thus forward their resulting measured value directly to the section evaluation unit of the uppermost detection unit, for example. In addition, the lowest detection unit with its specific acquisition section always supplies the media-specific measurement data. For this purpose, the lowest unit is always provided with the specific electrodes. In this way, for example, conclusions can be drawn about the type of medium via the capacitance measured at the specific detection section. In the uppermost section evaluation unit, for example, all the resulting measured values received are then in turn used for calculating a value corresponding to the level and the value corresponding to the level is output. The transfer of measurement data by other sections to the master is preferably done electronically or via a bus protocol, such as PC.

BRIEF DESCRIPTION OF THE DRAWINGS

Examples of the disclosure are explained in more detail below with reference to drawings.

Corresponding parts are marked with the same reference symbols in all figures.

DESCRIPTION

Figure 1:
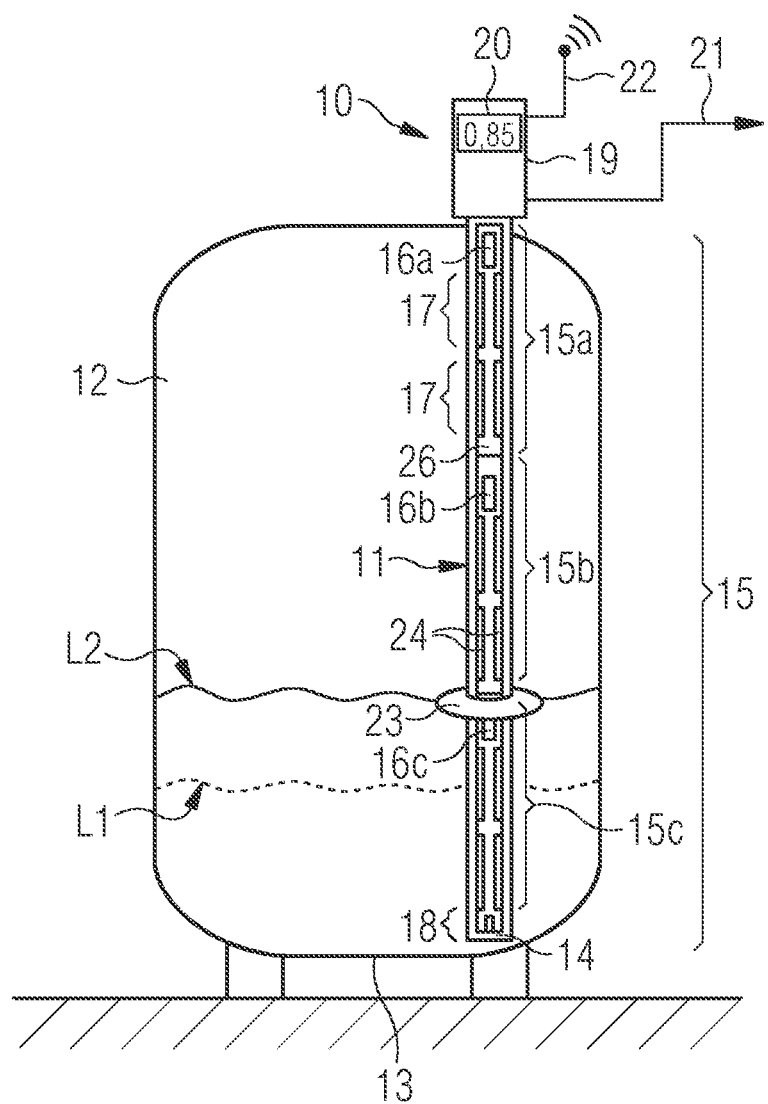
FIG. 1 schematically shows a level measuring device in an installed state.

In FIG. 1, a possible example of a level measuring device 10 is shown in an installed state.

A sensor housing 11 of the level measuring device 10 is arranged at least almost completely within a container 12. A level L1, optionally a level L2 of a fluid, is shown in the container 12. The fluid is, for example, a liquid. A lower end 14 of the sensor housing 11 thereby extends, for example, to a bottom 13 of the container 12.

In curved containers 12, as shown, there usually remains an undefinable gap to the bottom 13. The further the sensor housing 11 is from the bottom 13, the more difficult it is to measure a minimum level. A minimum distance to the container bottom 13 is not provided. Optionally, at least a very reduced distance is to be provided here.

Depending on the magnitude and dimension of the container 12, the level measuring device 10 can be adapted in its size. Thus, in FIG. 1, three detection units 15a, 15b, 15c are shown within the sensor housing 11, which form a detection unit 15.

For example, a respective detection unit 15a, 15b, 15c comprises or is formed as a printed circuit board 26 shown in more detail in FIG. 2, wherein the printed circuit board 26 can be shortened, for example, in sections. As in the illustrated example, several, for example at least three, detection units 15a, 15b, 15c can be connected to each other and combined. The respective detection unit 15a, 15b, 15c may thereby comprise several layers. For example, several conductor tracks are implemented on different layers, which guide electric current and/or signals.

Each detection unit 15a, 15b, 15c comprises, for example, a section evaluation unit 16a, 16b, 16c and at least two detection sections 17. The section evaluation units 16a, 16b, 16c are, for example, each an integrated microcontroller. The detection sections 17 are, for example, each formed by a pair of electrodes 24 and associated counter electrodes. The counter electrodes are arranged in a manner not shown in greater detail, for example as a pair of counter electrodes on the other side, i.e. opposite the respective pair of electrodes 24.

For example, an uppermost section evaluation unit 16a is operated as a master and receives measured values and/or data from the subsequent lower evaluation units 16b, 16c, which are operated as slaves.

The lowest detection unit 15c is the one closest to the bottom 13 of the container 12. A specific detection section 18 is arranged at the lowest detection unit 15a. The specific detection section 18 is formed to be shorter than the other detection sections 17, for example.

At the upper end of the sensor housing 11, a housing 19 is arranged which includes a display 20 and/or interfaces 21 for a wired output and/or a wireless output 22.

Furthermore, a float 23 is provided, which can be seen in redundancy to the level sensor 10. This can, for example, additionally be detected magnetically. By means of the float 23 redundantly determined values to the filling level L1, L2 can for example also be passed on to the section evaluation unit 16a operated as master, whereby an accuracy of the filling level measurement can be improved.

Figure 2A:
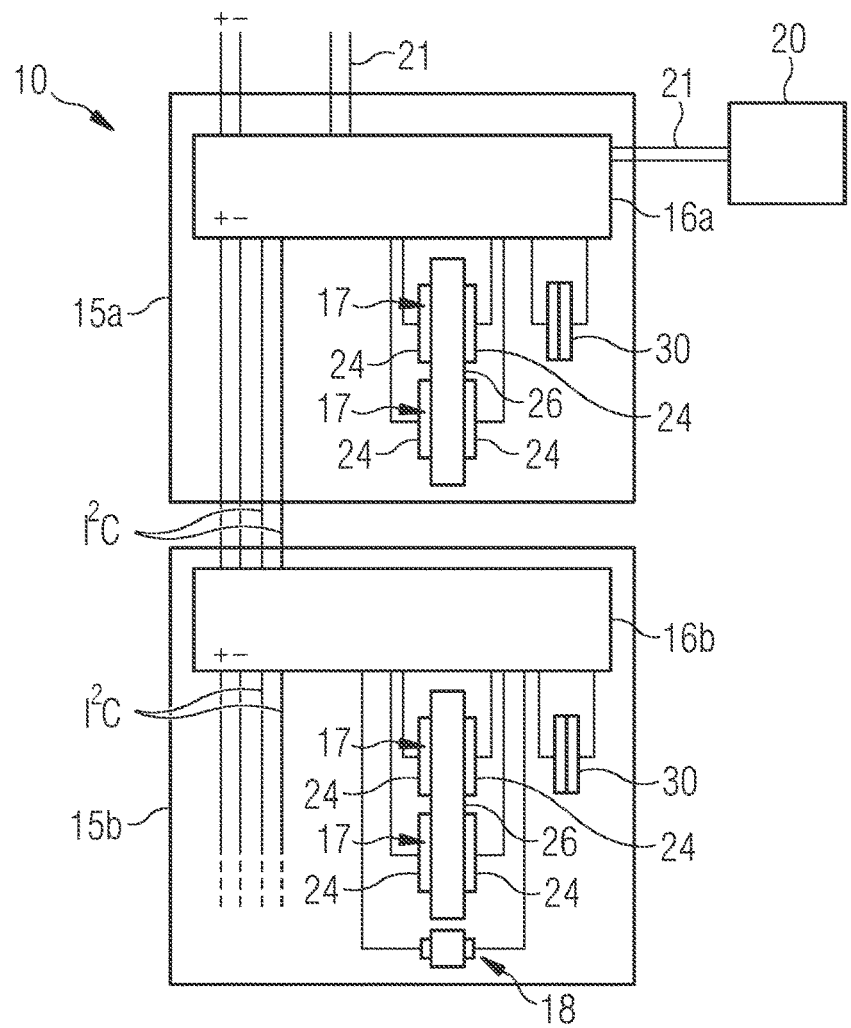
FIG. 2a schematically shows a circuit diagram of an electrical circuit of a level meter, FIG. 2b schematically shows a voltage curve at an evaluation unit, FIG. 3a schematically shows a first example of a level measuring device with a detection unit, FIG. 3b schematically shows a sectional view of a lowermost detection section of the level measuring device according to FIG. 3a, FIG. 3c schematically shows a second example of a level measuring device with two detection units, FIG. 3d schematically shows components and a structure of a level measuring device, FIG. 3e schematically shows a flexible design of a level measuring device, and FIG. 4 schematically shows a cross-section of a detection unit of a level measuring device.

FIG. 2a schematically shows an electrical circuitry of a level measuring device 10.

The level meter 10 comprises two detection units 15a, 15b. The sensing units 15a, 15b may correspond to a printed circuit board 26 with multiple layers, as also exemplified in FIG. 4. Also, the detection units 15a, 15b may comprise such a printed circuit board 26.

Each acquisition unit 15a, 15b comprises a section evaluation unit 16a, 16b in the form of a microcontroller. Here, the upper section evaluation unit 16a is operated as a master unit, for example, and the lower section evaluation unit 16b is operated as a slave unit. Further slave units could still follow below, which is shown schematically by the dash lines of the power supply +− and a data line I$^2$C, for example via PC bus, at the lower acquisition unit 15b.

Furthermore, each acquisition unit 15a and 15b comprises two pairs of electrodes 24. Schematically, these are arranged on edges of a printed circuit board 26, which is also shown schematically. Furthermore, two reference capacitors 30 are provided, whereby these are shown outside the indicated section evaluation units 16a, 16b for a better overview. However, the reference capacitors 30 are in particular part of the section evaluation units 16a and 16b. An interface 21 to an output device or the display 20 is arranged on the uppermost section evaluation unit 16a (master), which is operated in particular as a master.

Figure 2B:
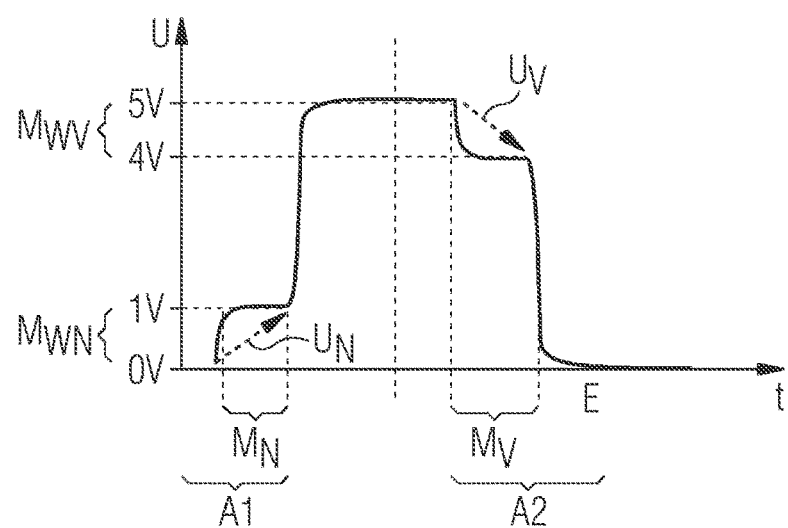

FIG. 2b shows an exemplary curve of a voltage U applied to an input of a section evaluation unit 16a, 16b, 16c or evaluation unit 16 over time t during a measurement with respective double measurement by reversing the polarity at a detection section 17.

In principle, a reference capacitor 30 or a detection section 17 is always charged for this purpose, whereupon a discharge subsequently results via circuitry of the two partners. A voltage level resulting from this is regarded as a measured value. A scanning of an electrode or a cycle, which consists of charging, circuitry and measuring, lasts for example about 1 µs or for example 0.2 µs to 1.8 µs. It is particularly advantageous to keep the time span as short as possible in order to keep the susceptibility of the setup to interference low.

For example, the reference capacitor 30 is designed as follows: A capacitance is, for example, between 2 pF and 35 pF, in particular between 15 pF and 25 pF or in particular 18 pF. The reference capacitor 30 is externally attached to the measurement circuitry or optionally integrated into an integrated circuit or chip. The capacitance that is set at the sensing sections 17 is variable and depends on the pending level L1, L2 and properties of the medium itself.

Before the measurement starts, the reference capacitor 30 is in particular uncharged and no voltage U (0 V) is present there. At the same time, a sensing section 17 driven accordingly by a multiplexer is positively charged with, for example, a reference voltage 5 V. Optionally, the measurement accuracy can also be achieved by higher voltages U. For this purpose, for example, the voltage U can always be increased to 10 V for all measurements before the reference capacitor 30 and the detection section 17 are electrically connected to each other.

A sequence of a measurement can be made here as follows:

1st Measurement (Represented by a Section A1):

As soon as the reference capacitor 30 and the detecting section 17 are connected together, a phase for detecting a first measured value $M_{WN}$ in a normal measurement $M_N$ starts. Here, a curve of an adjusting voltage U begins to rise to a compensation level of, for example, about 1 V. This is represented here by a voltage curve $U_N$.

Thus, the first measured value $M_{WN}$ of the first normal measurement, the normal measurement voltage, is obtained. Subsequently, an AD conversion of this voltage value is performed and the value is stored as the first measured value $M_{WN}$.

Now following a charging of the reference capacitor 30 takes place. Consequently, an increase of the voltage U up to the reference voltage of, for example, 5 V takes place. The voltage U of the detection section 17 is then almost 0 V at this point, i.e. at the end of section A1.

2nd Measurement (Comparison Measurement)

The second measurement is shown in a section A2. There, the same measurement as described above is performed, but inverted. Thus, for the second measurement, the circuitry of the reference capacitor 30 and the respective acquisition section 17 is performed. A compensating voltage settling here corresponds to a second measured value $M_{WV}$. This equalizing voltage collapses, for example, to a voltage U of about 4 V. A voltage drop, represented by a voltage waveform $U_V$, of again about 1 V is measured. Then an AD conversion of the second measured value MMV is performed.

After the two measurements, the two capacitors, that is, the reference capacitor 30 and a capacitor formed by the respective detection section 17, that is, by the electrode pairs 24, are discharged again and then comprise 0 V each, represented by a section E.

There are now two values of the voltage levels from sections A1 and A2. These are converted, as already described, into digital values corresponding to any level L1, L2 that may be present. The advantage from the two measurements for one and the same detection section 17 is in particular that an average value can be formed from both voltage levels, whereby any measurement errors that may have occurred can be attenuated or compensated.

Figure 3A:
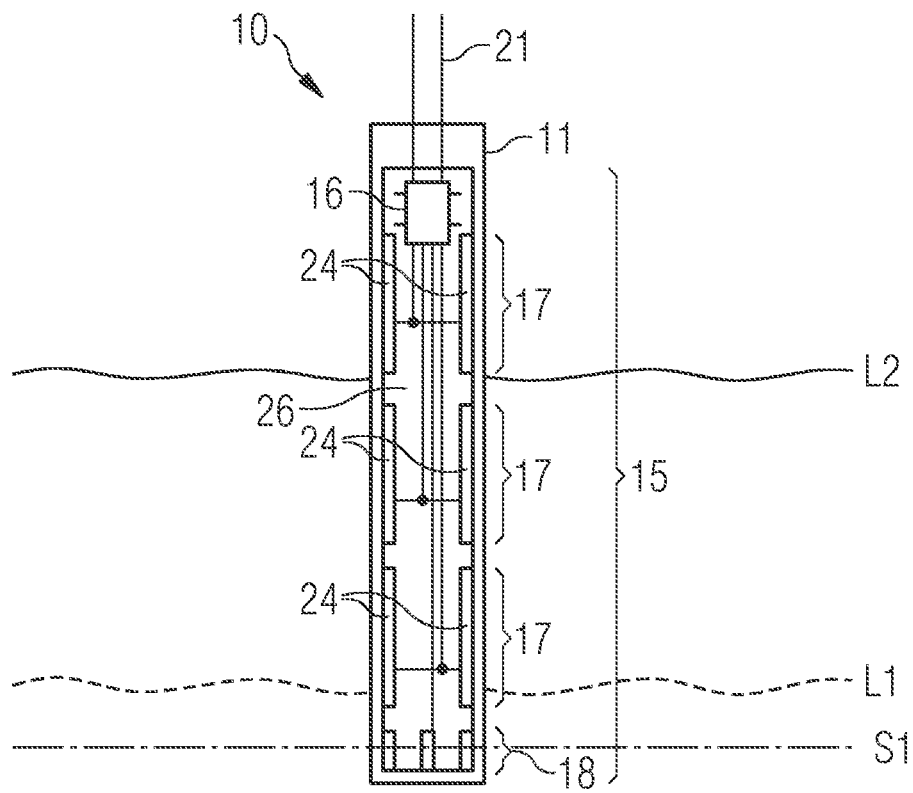

FIG. 3a shows a further possible example of a level measuring device 10. Here, a detection unit 15 is arranged in the tubular sensor housing 11. The sensor housing 11 consists, for example, of a plastic, for example polypropylene (PP). With the specific detection section 18 a total of four detection sections 17, 18 are arranged on the detection unit 15. The lowest detection section 18 is here the specific detection section 18. Each detection section 17 comprises an electrode pair 24 of two electrically connected electrodes.

Each electrode pair 24 and the specific detection section 18 are connected to an evaluation unit 16.

Via the interface 21, measurement data from the evaluation unit 16 can be output to a display that is not shown or to a radio unit that is also not shown.

During a first-time filling process and a measuring process carried out in the process, the specific detection section 18 is the detection section which is first surrounded by the medium or fluid and is influenced by it.

For an initial filling level measurement, a maximum capacity of the specific detection section 18 must be determined. For this purpose, it must be completely surrounded by the fluid. Furthermore, to ensure this, the detection section 17 following the specific detection section 18 can also be surrounded by fluid, for example to at least 10 percent, to ensure that for a reference measurement of the fluid the specific detection section 18 is completely surrounded by fluid (level L1). The maximum capacity of the specific detection section 18 measured for the first time then serves as a correction/reference value for all further measurements at the other detection sections 17 along the detection unit 15. Since the level L1 cannot be measured precisely during an initial measurement, we can speak here of an initial dead zone or learning zone. In the further course, the sensor system, i.e. the level measuring device 10, can be taught in a self-learning manner or by so-called "teach-in" also to low levels L1, L2.

Figure 3B:
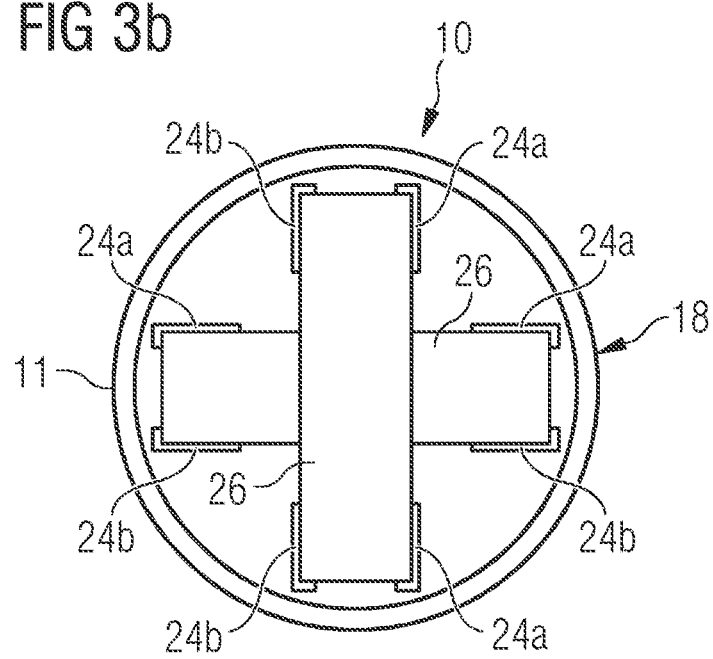

FIG. 3b shows a section of the level meter 10 according to FIG. 3a.

A broken line with strokes and points defines a sectional plane S1 (see FIG. 3a).

In order to keep the above-mentioned dead zone as small as possible, the specific detection section 18 is correspondingly shorter than the other detection sections 17. However, in order to obtain a measurement result for the specific detection section 18 that is comparable to the other detection sections 17, this section is formed, for example, in a cross shape. Thus, not only one pair of electrodes 24, but a total of two or four pairs of electrodes 24 are formed. Here, electrode pairs 24a are always connected together as one electrode as well as electrode pairs 24b as one electrode.

Figure 3C:
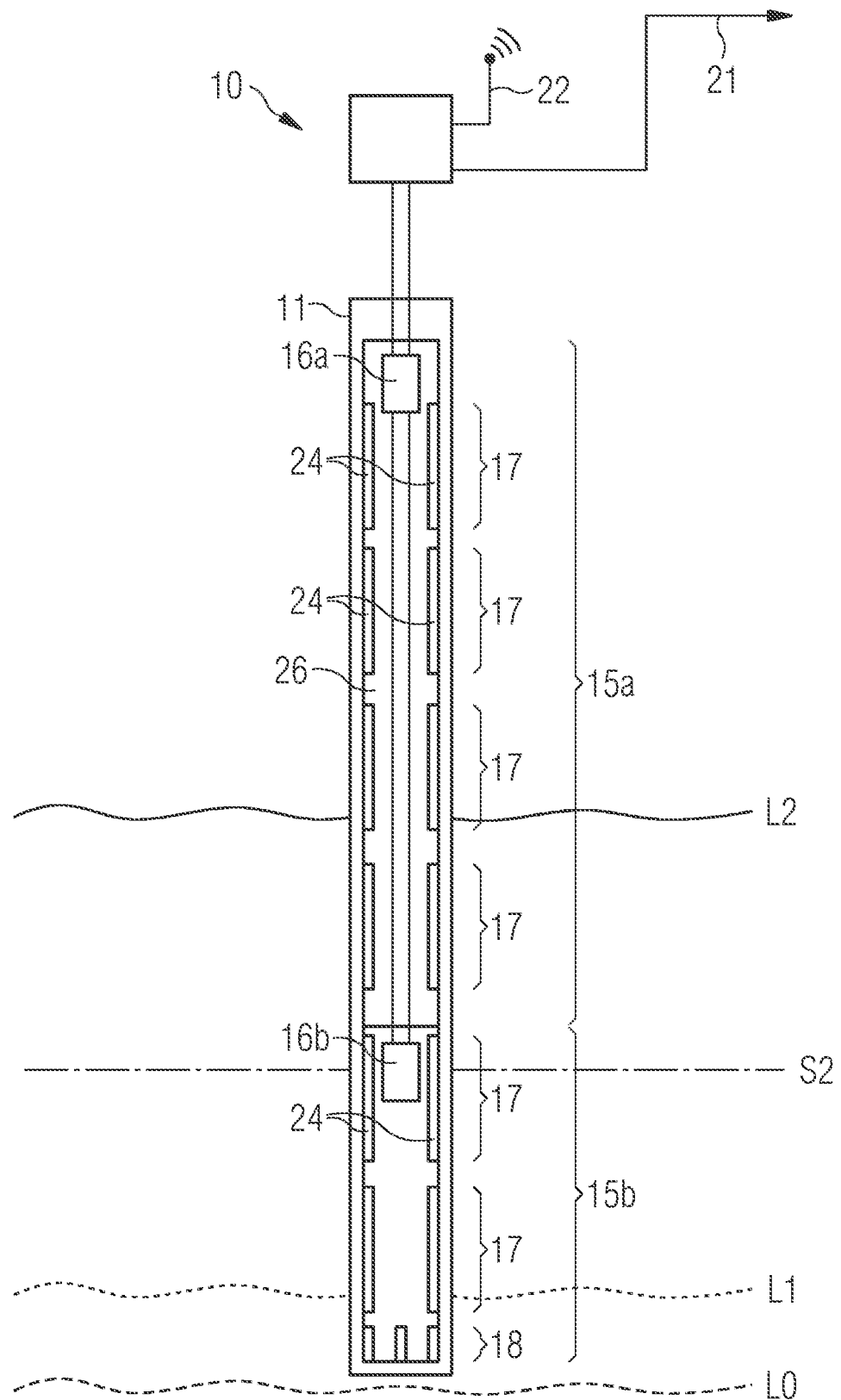

FIG. 3c shows an example of a level measuring device 10 with a combination of two detection units 15a, 15b. A lower detection unit 15b is shorter than an upper detection unit 15a. This is to illustrate an individual length design of the detection units 15a, 15b. Printed circuit boards 26, with which the detection units 15a, 15b are implemented, can be separated in sections, for example, together with the electronics, i.e. they can be cut to length. Here, in particular, the bottom always shortened such that at least the specific detection section 18 and a detection section 17 are present and/or attachable.

A further specific detection section 18 on the upper detection unit 15a is not necessary and not provided. The detection units 15a, 15b each comprise a section evaluation unit 16a, 16b in the form of a microcontroller. Here, the upper section evaluation unit 16a operates as a master and the lower section evaluation unit 16b operates as a slave. The master gives instructions to the slave and receives measured values of the detection sections 17 of the lower detection unit 15b. As described earlier, the detection sections 17 consist of a pair of electrodes 24 with corresponding counter electrodes, which are not shown in detail.

FIG. 3c can also be used to illustrate a process sequence for filling a container 12:

For example, a scanning of the detection sections 17 takes place in sequence from bottom to top. This process sequence is cyclic and always starts anew as soon as the last, i.e. the uppermost, detection section 17 has been scanned.

An initial state is defined in that the level measuring device 10 is installed in the container 12 and is minimally spaced from the container bottom 13, which is not shown here. The container 12 is filled to a minimum level L0 or even empty. In any case, the level L0 has not yet come into contact with the sensor housing 11 of the level measuring device 10.

If the filling is now detected automatically in a continuous filling process, an intelligent evaluation unit 16 and/or section evaluation unit 16a, 16b, 16c can also calibrate itself.

During a filling process, the filling level increases, for example, from a filling level L0 to a filling level L1. During this process, the fluid completely surrounds a lower portion of the sensor housing 11, on which the specific detection section 18 is arranged, up to the level L1. A capacitance or voltage level measured in this process is maximum with respect to the specific detection section 18. And thus, media-specific characteristics of the evaluation unit 16 and/or section evaluation unit 16a, 16b, 16c are also known. The values can either be stored or can be determined again after each complete measuring process, i.e. after triggering/controlling and scanning of all detection sections 17.

When the level L1 is reached, the evaluation unit 16 and/or section evaluation unit 16a, 16b, 16c detects approximately 10 percent on the first detection section 17 and can now safely measure and store the detected values from the specific detection section 18. In the following, the detection section 17 or the electrodes 24 are then covered. From this point on, a high-quality statement can be made about the level L1, L2 of the fluid in the container 12. This is only possible because a maximum capacity of the specific detection section 18 is known.

The detection sections 17 following upwards are not yet covered by the fluid. Therefore, no change in capacitance or voltage level can be measured. If the filling level continues to rise up to the filling level L2 or even beyond, more and more detection sections 17 are under the influence of the fluid and the evaluation unit 16 and/or section evaluation unit 16a, 16b, 16c can record the respective values for this and store an internal characteristic curve.

In the case of continuous filling of the container 12 with a self-learning initial detection, different container geometries can also be detected, stored as a characteristic curve and then evaluated as a percentage or according to volume, for example in the case of a spherical tank.

Especially with large fill levels L1, L2, for example up to 2 m, temperature differences in the fluid can lead to measurement inaccuracies. To compensate for these, maximum values of the detection sections 17 already completely covered by the fluid are compared with each other. Alternatively, temperature sensors can also support this compensation.

Figure 3D:
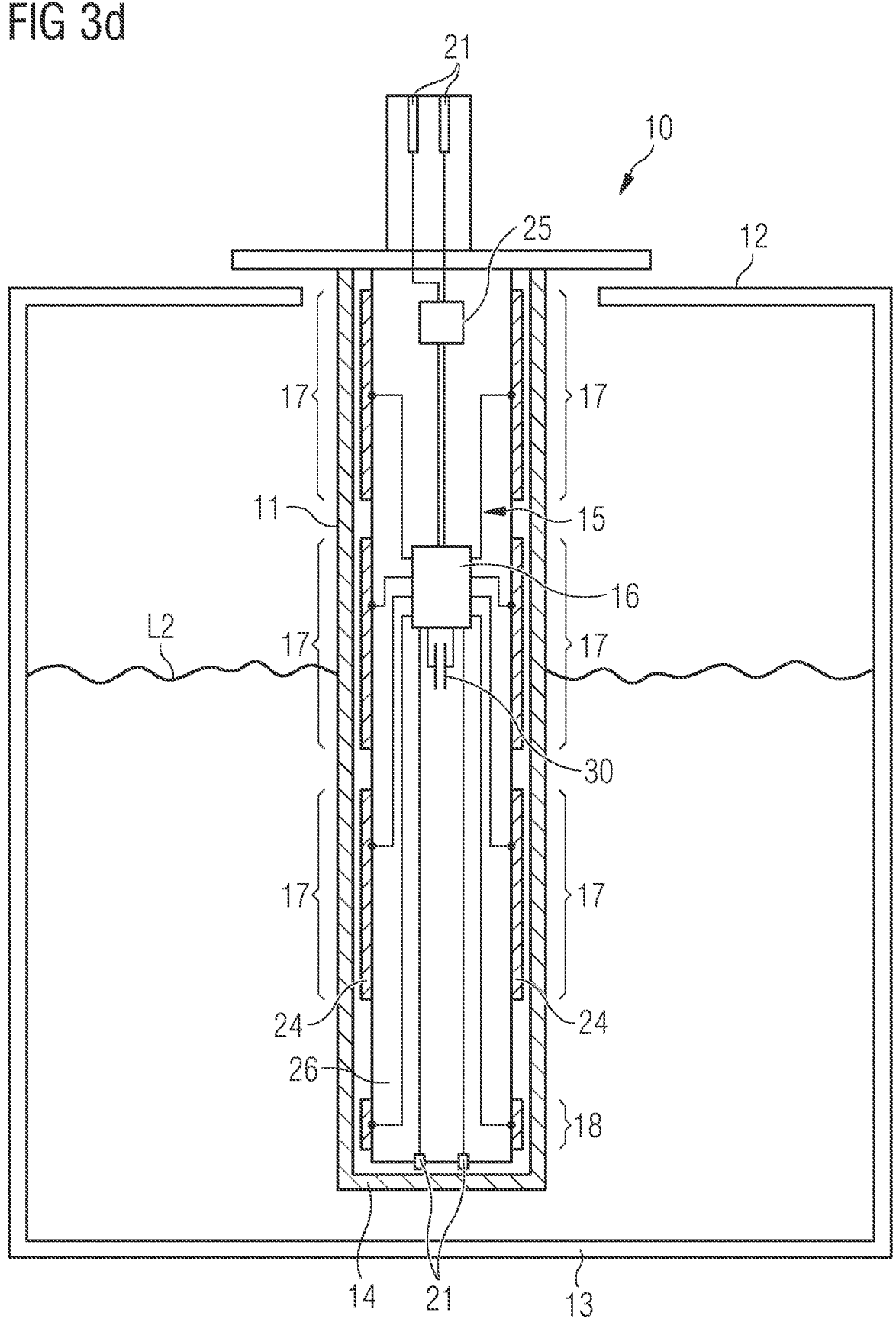

FIG. 3d shows an example of a level measuring device 10. At the lower end 14 of the sensor housing 11 or at the end of the detection unit 15, an interface 21 is formed for connecting a further detection unit 15, 15a, 15b, 15c, which is not shown in more detail. The specific detection section 18 is preferably shorter than the detection sections 17 but is formed in a cross shape, and therefore optionally comprises twice the number of electrodes or electrode pairs 24 than a detection section 17 on the printed circuit board 26. The detection sections 17 and their electrode pairs 24 are arranged at regular and constant intervals along the detection unit 15.

A central component of a detection unit 15 is an evaluation unit 16. In the case of a plurality of detection units 15 correspondingly, it is possible to speak of, for example, superordinate and subordinate section evaluation units 16a, 16b, 16c. Master-slave communication is provided here, for example. All inputs and outputs of the detection sections 17 are connected to the evaluation unit 16. A further additional data processing unit or bus communication unit 25 may also be provided, in particular in the event that the measurement, processing and forwarding of the measured values is to be implemented on the basis of several different individual electronic components.

The reference capacitor 30 is here an outsourced component of the evaluation unit 16, which may otherwise be formed fully integrated. The multiplexer not shown, which is also a component of the evaluation unit 16, controls the respective inputs and outputs of the detection, sections 17 and the reference capacitor 30 and electrically couples them together.

Figure 3E:
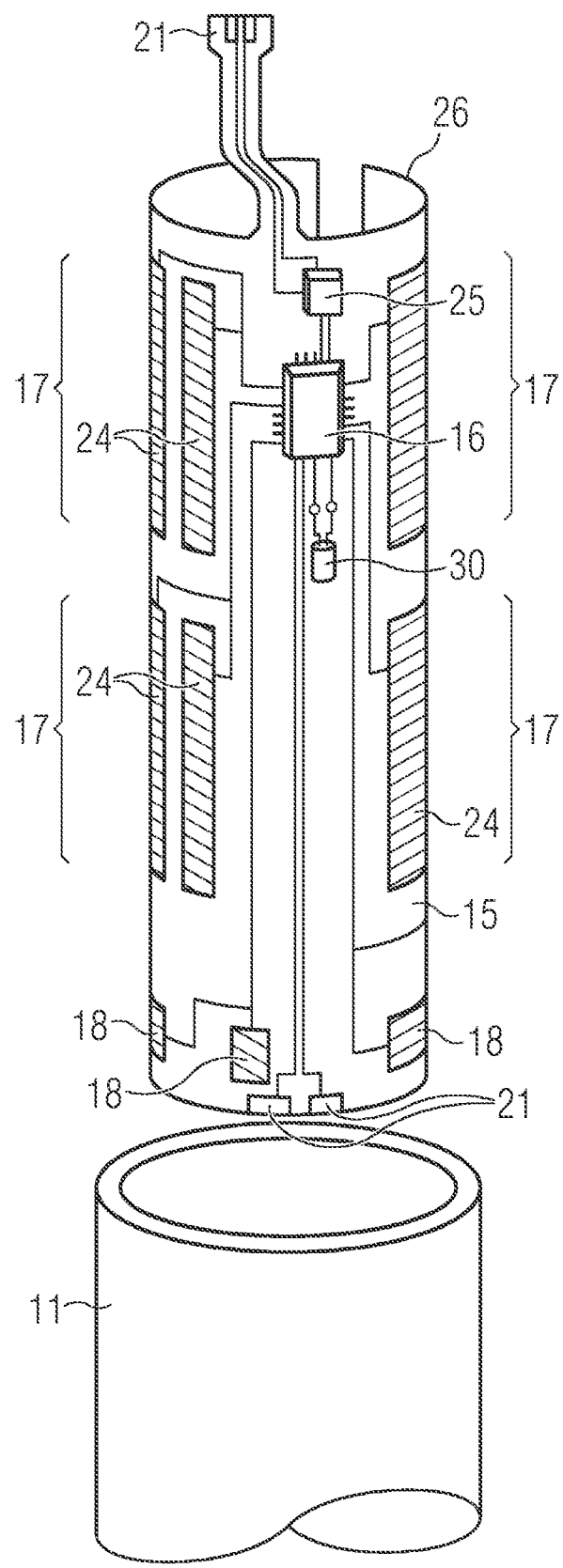

FIG. 3e shows another example of a level measuring device 10.

The detection unit 15 can also be formed on a flexible printed circuit board (FPC). The other components, such as the evaluation unit 16 or section evaluation units 16a, 16b, 16c and the detection sections 17 are retained and can then be flexibly attached to a wall of the sensor housing 11.

Also formed at the lower end of the detection unit 15 is an interface 21 for data and power transmission to possible subsequent detection units 15, 15a, 15b, 15c. Likewise, an interface 21 is provided at the upper end. This gives the option of connecting a display 20 or a radio module—as already mentioned. The flexible sensing unit 15 is flexible and can take a circular contour like the sensor housing 11.

In FIG. 4, a sectional view along a sectional plane S2 according to FIG. 3C is shown through a detection section 17. The detection unit 15 is formed as a printed circuit board 26 having three layers. However, the number of layers need not be limited to three, but may differ depending on the application.

The circuit board 26 is arranged within the sensor housing 11. Here, the detection sections 17 are formed in the form of electrode pairs 24. Electrode pairs 24b, which are formed as counter electrode pairs, are arranged to the electrode pairs 24a. The two electrodes of an electrode pair 24, 24a, 24b are electrically connected to each other and have a common connection to the section evaluation unit 16b. In this example, the section evaluation unit 16b is, for example, an integrated microcontroller in which a reference capacitor 30 and a bus communication are accommodated. The entire detection unit 15 is arranged in the tubular sensor housing 11.

Further, FIG. 4 schematically shows an electric field 27 forming around the pairs of electrodes 24a and 24b. The electric field 27 is formed by the arrangement of the electrode pairs 24a and 24b on the shorter sides or edges of the circuit board 26.

The disclosure is not limited to the foregoing detailed examples. It may be modified to the extent set forth in the following claims. Likewise, individual aspects of the dependent claims may be combined.

REFERENCE SYMBOLS 10 level measuring device/level gauge/level meter
11 sensor housing
12 container
13 bottom
14 lower end
15, 15a, 15b, 15c detection unit
16 evaluation unit
16a, 16b, 16c section evaluation unit
17 detection section
18 specific detection section
19 housing
20 display
21 interface
22 output
23 float
24, 24a, 24b electrode pair
25 bus communication unit
26 printed circuit board
27 electric field
30 reference capacitor
A1, A2 section
E section
FC data line
L0, L1, L2 level
$M_N$ Normal measurement
$M_{WN}$, $M_{WV}$ measured value
S1, S2 sectional plane
U voltage
$U_N$, $U_V$ voltage curve
t time
+− power supply

The invention claimed is:

1. A level measuring device comprising at least one detection unit for detecting a filling level (L0, L1, L2) of a medium, an electronic circuit and a sensor housing for accommodating the at least one detection unit, wherein
the sensor housing is elongated and/or tubular and is provided for immersion in the medium,
the detection unit comprises at least two detection sections arranged one above the other, which are each configured to detect a capacitance caused by the filling level of the medium that is at least partially in contact with the outside of the sensor housing (11), and
the electronic circuit comprises a reference capacitor, wherein the level measuring device is configured to alternately, cyclically, electrically couple the electronic circuit to the detection sections,
wherein:
at least one detection unit is configured to charge each detection section with opposite polarity to the reference capacitor, and
when the respective detection section is connected to the reference capacitor, a voltage level is established, wherein the established voltage level corresponds to a filling level (L0, L1, L2) applied externally to the sensor housing and/or the detection section.

2. The level measuring device according to claim 1, wherein:
at least one further specific detection section or at least one further electrode for detecting a specific environmental variable is arranged at a lower end of the detection unit.

3. The level measuring device according to claim 2, wherein:
an electronic circuitry of the detection section and/or of the specific detection section is configured to charge the detection section and/or the specific detection section with opposite polarity and cyclic.

4. The level measuring device according to claim 2, wherein:
the electrodes or electrode pairs of the specific detection section are cross-shaped and/or designed with at least two electrode pairs.

5. The level measuring device according to claim 2, wherein:
the at least one further specific detection section is formed shorter than the detection sections.

6. The level measuring device according to claim 1, wherein:
a plurality of detection units is connected and/or coupled to one another within the sensor housing,
the detection units, each comprises an evaluation unit or section evaluation unit and
the evaluation unit and/or section evaluation unit are/is designed to transmit their measured values ($M_{WN}$, $M_{WV}$) to a master.

7. The level measuring device according to claim 6, wherein:
the evaluation unit and/or section evaluation unit comprise at least one microcontroller or are designed as a microcontroller, which is electrically coupled to a specific detection section wherein a minimum filling level (L0, L1, L2) is detected and determined by electrodes thereof.

8. The level measuring device according to claim 6, wherein;
the evaluation unit and/or section evaluation unit are/is designed to detect parameters relating to a medium temperature and/or to other environmental influences in a self-learning manner within the framework of a learning process and to store them in the electronic circuit as reference values.

9. The level measuring device according to claim 6, wherein:
the detection unit and/or evaluation unit and/or the section evaluation unit comprise(s) a temperature sensor.

10. The level measuring device according to claim 1, wherein:
the detection sections are each formed in pairs and/or opposite each other.

11. The level measuring device according to claim 1, wherein:
the detection sections are formed as conductive sections on or at circuit boards and/or
the detection sections are respectively formed as electrodes on edges and/or at least in regions on side surfaces of circuit boards.

12. The level measuring device according to claim 1, wherein:
the reference capacitor is integrated in an integrated circuit or chip and/or
a capacitance of the reference capacitor is between 2 pF and 35 pF, and/or
the detection unit with the detection sections is arranged on a mechanically flexible, printed circuit board.

13. The level measuring device according to claim 1, wherein:
the detection sections and/or electrodes are electrically conductively connected to the sensor housing at least in sections.

14. A method for measuring a filling level (L0, L1, L2) with a filling level measuring device with a sensor housing and at least one detection unit, wherein
the sensor housing is intended to be immersed in a medium, and
the detection unit comprises at least one detection section by means of which a capacitance caused by the filling level (L0, L1, L2) of the medium that is at least partially in contact with the outside of the sensor housing, and the method comprising:
alternately, cyclically, electrically coupling a reference capacitor of an electronic circuit to the at least one detection section,
alternately, cyclically, electrically coupling each detection section with the reference capacitor during a detection operation by a measuring circuit,
detecting a capacitance caused by the filling level of the medium that is at least partially in contact with the outside of the sensor housing (11),
calculating measured values of the detection process for the detection section with stored values of a measurement and with measured values of a specific detection section, and
outputting the calculated measured values as filling level values at an interface.

15. The method according to claim 14, wherein:
respectively determined measured values, capacitances and voltages at electrodes of the detection sections are interrogated twice and/or interrogated with opposite poles.

16. The method according to claim 14, wherein:
a magnitude of the detected capacitance:
is analogous to a level (L0, L1, L2) applied to the detection section and/or sensor housing,
is calculated at least in a respective section evaluation unit and/or evaluation unit, and
is output to the outside directly or via a higher-level master unit via an interface.

17. A level measuring device comprising at least one detection unit for detecting a filling level of a medium, an electronic circuit and a sensor housing for accommodating the at least one detection unit, wherein:
the sensor housing is intended to be immersed in a medium,
the detection unit comprises at least one detection section which is configured to detect a capacitance caused by the filling level (L0, L1, L2) of the medium that is at least partially in contact with the outside of the sensor housing, and
an electronic circuit comprises a reference capacitor, which is alternately, cyclically connected to the at least one detection section,
wherein:
the at least one detection section is charged with opposite polarity to the reference capacitor, and
when the respective detection section is connected to the reference capacitor, a voltage level is established, wherein the voltage level correlates with a filling level (L0, L1, L2) applied externally to the sensor housing and/or detection section.

18. A level measuring device comprising a sensor housing for accommodating at least one detection unit for detecting a filling level (L0, L1, L2), wherein
the sensor housing is intended to be immersed in a medium,
the detection unit comprises at least one detection section, each configured to detect a capacitance caused by the filling level (L0, L1, L2) of the medium that is at least partially in contact with the outside of the sensor housing, and
an electronic circuit comprises a reference capacitor, which is alternately, cyclically, electrically coupled to the at least one detection section wherein:
the at least one detection section is charged with opposite polarity to the reference capacitor, and
a voltage level is established when the detection section is connected to the reference capacitor,
wherein the voltage level is processed to a filling level signal, and
the filling level signal is outputted output.

19. A method for measuring a filling level (L0, L1, L2) comprising a filling level measuring device with a sensor housing and at least one detection unit, wherein
the sensor housing is intended to be immersed in a medium,
the detection unit comprises at least one detection section, configured to detect a capacitance caused by the filling level (L0, L1, L2) of the medium that is at least partially in contact with the outside of the sensor housing, and
a reference capacitor of an electronic circuit is alternately, cyclically, electrically coupled to the at least one detection section,
the method comprising:
alternately, electrically coupling, during a detection process by a measuring circuit, the at least one detection section to the reference capacitor, and
detecting a voltage level when the detection section is connected to the reference capacitor and correlates the detected voltage level with a filling level (L0, L1, L2) applied externally to the sensor housing and/or detection section.

20. A method for measuring a filling level (L0, L1, L2) comprising
a filling level measuring device with a sensor housing and at least one detection unit, wherein:
the sensor housing is intended to be immersed in a medium,
the detection unit comprises at least one detection section configured to detect a capacitance caused by the filling level (L0, L1, L2) of the medium that is at least partially in contact with the outside of the sensor housing, and
a reference capacitor of an electronic circuit is alternately, cyclically, electrically coupled to the at least one detection section,
the method comprising:
alternately, electrically coupling, during a detection operation by a measuring circuit, the at least one detection section is to the reference capacitor
detecting at least one specific environmental variable by means of at least one specific detection section arranged at a lower end of the detection unit, calculating measured values of the detection process at least with measured values of the specific detection section, and outputting the calculated measured values as filling level values.

\* \* \* \* \*